US010053213B1

(12) United States Patent
Tu

(10) Patent No.: US 10,053,213 B1
(45) Date of Patent: Aug. 21, 2018

(54) MULTI-COPTER LIFT BODY AIRCRAFT WITH TAIL PUSHER

(71) Applicant: Pinnacle Vista, LLC, Upland, CA (US)

(72) Inventor: Haofeng Tu, Shanghai (CN)

(73) Assignee: Pinnacle Vista, LLC, Upland, CA (US)

( * ) Notice: Subject to any disclaimer, the term of this patent is extended or adjusted under 35 U.S.C. 154(b) by 0 days.

(21) Appl. No.: 15/589,409

(22) Filed: May 8, 2017

(51) Int. Cl.
| B64C 27/22 | (2006.01) |
| B64C 27/26 | (2006.01) |
| B64C 27/82 | (2006.01) |
| G05D 1/08 | (2006.01) |
| G05D 1/02 | (2006.01) |
| G05D 1/04 | (2006.01) |
| B64C 39/02 | (2006.01) |

(52) U.S. Cl.
CPC .............. *B64C 27/26* (2013.01); *B64C 27/82* (2013.01); *B64C 39/024* (2013.01); *G05D 1/0202* (2013.01); *G05D 1/042* (2013.01); *G05D 1/0858* (2013.01); *B64C 2027/8236* (2013.01); *B64C 2201/066* (2013.01); *B64C 2201/088* (2013.01); *B64C 2201/104* (2013.01); *B64C 2201/108* (2013.01); *B64C 2201/128* (2013.01)

(58) Field of Classification Search
CPC ....... B64C 27/26; B64C 27/82; B64C 39/024; B64C 29/0025; B64C 2201/088; B64C 2201/104; B64C 2201/123; B64C 2201/127; B64C 2201/128; B64C 2201/108
See application file for complete search history.

(56) References Cited

U.S. PATENT DOCUMENTS

| 8,393,564 B2* | 3/2013 | Kroo ......................... B64C 3/56 244/17.23 |
| 9,120,560 B1* | 9/2015 | Armer ................. B64C 29/0008 |
| 9,586,683 B1* | 3/2017 | Buchmueller ........ B64C 39/024 |
| 9,682,772 B2* | 6/2017 | Yoon ......................... B60F 5/02 |
| 2003/0085319 A1* | 5/2003 | Wagner ..................... B64C 3/56 244/12.3 |
| 2012/0012692 A1* | 1/2012 | Kroo ......................... B64C 3/56 244/6 |
| 2013/0214086 A1* | 8/2013 | Kroo ......................... B64C 3/56 244/6 |
| 2015/0298800 A1* | 10/2015 | Yoon ......................... B60F 5/02 244/2 |
| 2016/0129998 A1* | 5/2016 | Welsh .................. B64C 39/024 244/12.3 |
| 2016/0207625 A1* | 7/2016 | Judas .................. B64C 29/0025 |

(Continued)

*Primary Examiner* — Philip J Bonzell
(74) *Attorney, Agent, or Firm* — WPAT, P.C. Intellectual Property Attorneys; Anthony King

(57) ABSTRACT

A multi-copter lift body aircraft has a push or pull propeller and a lift body that has a first airfoil shape on a front to rear cross-section and a second airfoil shape on a left to right cross-section. The lift body is made from a top shell and a bottom shell. The lift body has a nose and a tail. Multi-copter propellers are attached to the lift body. The multi-copter propellers provide a lift at low speeds and the lift body provides a lift at high speeds. Avionics can be stored in a hollow cavity of the lift body. The avionics may include a control circuit, batteries, and a radio receiver. The multi-copter has a lift body made from an upper shell and a lower shell. The lift body has an optimum attack angle at a cruising speed, and the lift body provides a combined lift mode.

19 Claims, 6 Drawing Sheets

(56) References Cited

U.S. PATENT DOCUMENTS

2016/0236774 A1\* 8/2016 Niedzballa .............. B64C 27/30
2016/0347447 A1\* 12/2016 Judas .................. B64C 29/0033
2017/0106978 A1\* 4/2017 Sopper .................. B65D 81/00
2017/0210486 A1\* 7/2017 O'Brien ................ B64D 47/08

\* cited by examiner

MULTI-COPTER LIFT BODY AIRCRAFT WITH TAIL PUSHER

FIELD OF THE INVENTION

The present invention is in the field of multicopter aircraft.

DISCUSSION OF RELATED ART

A variety of different multi-copters have provided vertical takeoff and landing (VTOL) capability for aircraft. For example, in U.S. patent publication 20060016930A1, entitled Sky Hopper and published on Jan. 26, 2006, inventor Pak describes a vertical takeoff and landing (VTOL) aircraft design using counter rotating fan blades for stability. Separate horizontal and vertical tilting mechanisms are delivered to the fan units, the disclosure of which is incorporated herein by reference.

Inventor Walton also utilizes counter rotating fan blades in a set of tour ducted fan units at the front, left, right, and rear of his VTOL aircraft. U.S. patent publication 20060226281A1, entitled Ducted fan vertical take-off and landing vehicle and published on Oct. 12, 2006, states that the vertical force created by the fan units "are provided with such redundancy that the aircraft can hover with up to two thrusters inoperative." Furthermore, the fan units are movable between a vertical lift position and a horizontal thrust position through a set of servos and gears, the disclosure of which is incorporated herein by reference.

Four fan units pivoted on strakes via arms are intercoupled via chain drives or linkages on inventor Bryant's VTOL aircraft as illustrated in U.S. patent publication 20110001001A1, Flying-wing aircraft, published on Jan. 6, 2011. The flying-wing shape of the aircraft may utilize fins, slats, flaps, and other control-surfaces for aerodynamic stability, the disclosure of which is incorporated herein by reference.

Similarly, the VTOL aircraft described in inventor Bothe's U.S. Pat. No. 5,823,468A, published on Oct. 20, 1998 and entitled Hybrid aircraft, uses turbo-electric driven propellers mounted on four outriggers, which are designed to distribute forces from the propellers to the hull. The lifting body hull creates aerodynamic lift and minimizes the need for panels of differing curvature in its construction, the disclosure of which is incorporated herein by reference.

Turbofan engines with separate core engines mounted on both sides of rear and front wings are described in U.S. patent publication 20030080242A1, published on May 1, 2003, by inventor Kawai and entitled Vertical takeoff and landing aircraft. These fan engines are capable of biaxial rotation for the purpose of providing power to both cruise and hover, the disclosure of which is incorporated herein by reference.

Inventor Austen-Brown describes the use of tiltmotors on his VTOL in Personal hoverplane with four tiltmotors, U.S. publication 20030094537A1, published on May 22, 2003. These tiltmotors can be tilted vertically in order for the aircraft to maintain steep descent. All tiltmotors have a sideways cant when tilted in order to reduce engine side loads and are equipped with emergency electric motors, the disclosure of which is incorporated herein by reference.

In U.S. Pat. No. 3,181,810A, entitled Attitude control system for VTOL aircraft and published by inventor Olson on May 4, 1965, an attitude control system for VTOL aircraft selectively adjusts the thrust of propellers, rotors, ducted fans, or jet engines through their gradual tilting from vertical to horizontal positions, the disclosure of which is incorporated herein by reference.

Selected angles of inclination of the thrust-generating devices improve the hovering stability of VTOL aircraft, as described by inventor Ducan in U.S. Pat. No. 5,419,514, entitled VTOL Aircraft Control Method and published on May 30, 1995. Additionally, spars, mounted at a fixed angle to the centerline of the aircraft's fuselage, support the thrust-generating devices to achieve their desired inclination by the spars' simple rotation, the disclosure of which is incorporated herein by reference.

Mechanisms on two main propellers tilt around the pitch, roll, and yaw axes of inventor Raposo's invention, the disclosure of which is incorporated herein by reference. In U.S. publication 20100301168A1, entitled System and Process of Vector Propulsion with Independent Control of Three Translation and Three Rotation Axis and published on Dec. 2, 2010, Raposo states that these tilting mechanisms can be used to perform lateral movements, upward or downward movements, and rotations around the vehicle yaw axis.

The turbine fans used in the VTOL aircraft described by inventor Rowe in U.S. Pat. No. 3,038,683A, entitled Vtol aircraft and published on Jun. 12, 1962, are driven by separate generators and are symmetrically arranged about the longitudinal centerline of the aircraft. The fans pivot to provide thrust for both vertical lift and horizontal cruising. The fans are identical and interchangeable, the disclosure of which is incorporated herein by reference.

SUMMARY OF THE INVENTION

A multi-copter lift body aircraft has a push or pull propeller and a lift body that has a first airfoil shape on a front to rear cross-section and a second airfoil shape on a left to right cross-section. The lift body is made from a top shell and a bottom shell. The lift body has a nose and a tail. Multi-copter propellers are attached to the lift body. Multi-copter propellers attached to the lift body provide a multi-copter propeller lift at low speeds, and the lift body provides a lift body lift at high speeds. Avionics can be stored in a hollow cavity of the lift body. The avionics may include a control circuit, batteries, and a radio receiver. The multi-copter has a lift body made from an upper shell and a lower shell. The lift body has an optimum attack angle at a cruising speed, and the lift body provides a combined lift mode. As an airspeed increases, the multi-copter propeller lift decreases with increased lift body lift so that the aircraft maintains the same altitude at any speed up to a top speed The lift body can also include a canard forward control surface. Control surfaces can be mounted to the lift body including a rudder, aileron and elevator. The center of gravity of the multi-copter mode is the center of gravity in airfoil mode and the airfoil center of gravity is approximately ⅓ from the nose. The multi-copter blades can be spinning in a spinning mode and locked in a locked mode such as by use of a hall sensor or encoder. The lift body preferably includes open concave curvatures without any ducted fans.

The multi-copter lift body preferably also has a camera in the nose of the lift body when a push propeller is mounted to the tail of the lift body. The lift body preferably has an airfoil with an attack angle that is not horizontal. The lift body upper shell and lower shell can be made by The lift body has an optimum attack angle at a cruising speed, and the lift body provides a combined lift mode.

Figure 1:
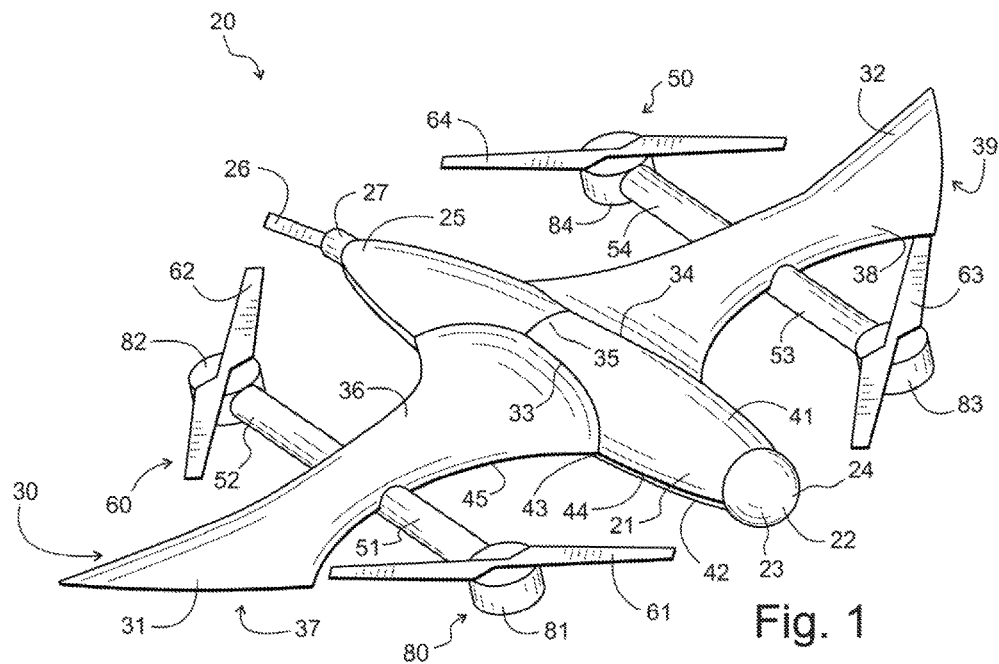
FIG. 1 is a first perspective view of the present invention.
Figure 2:
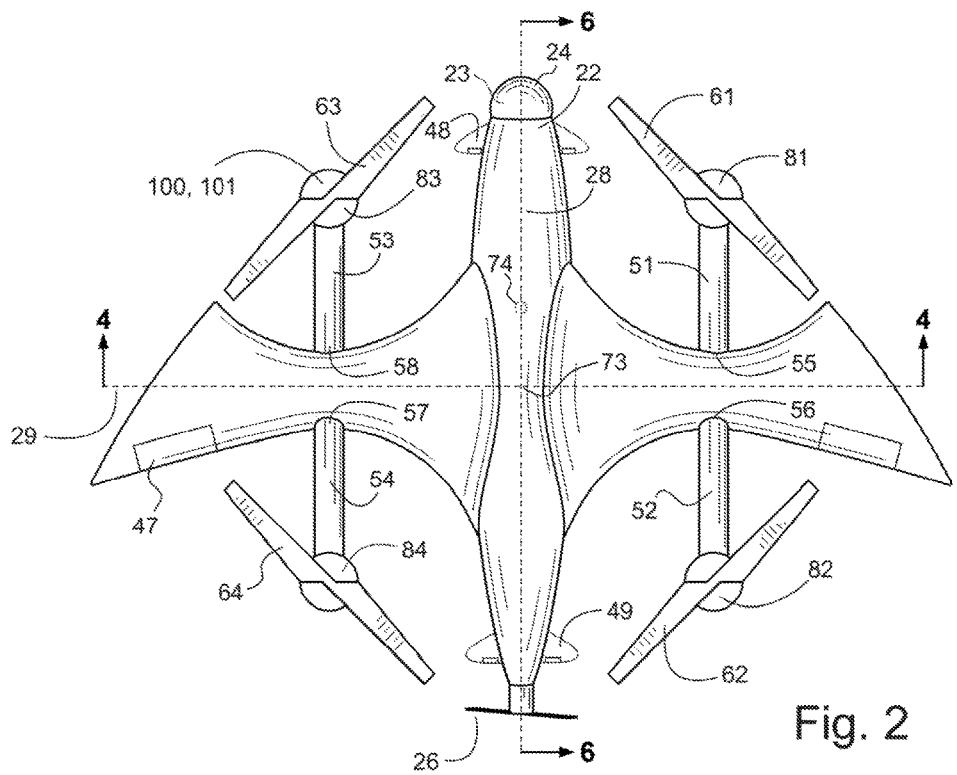
FIG. 2 is a first top view of the present invention.
Figure 3:
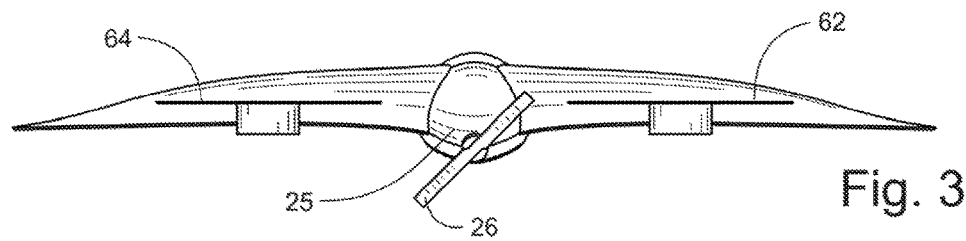
FIG. 3 is a first rear view of the present invention.
Figure 4:
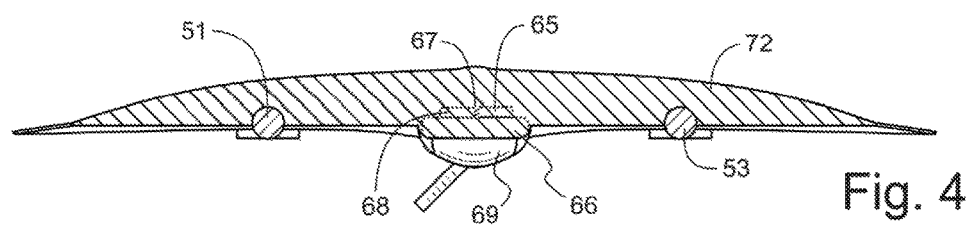
FIG. 4 is a first front cross-section view of the present invention along the lateral line 29.
Figure 5:
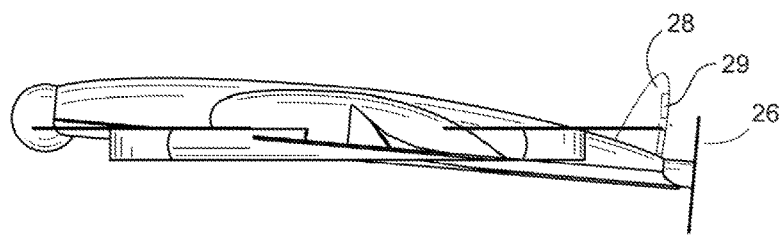
FIG. 5 is a first side view of the present invention.
Figure 6:
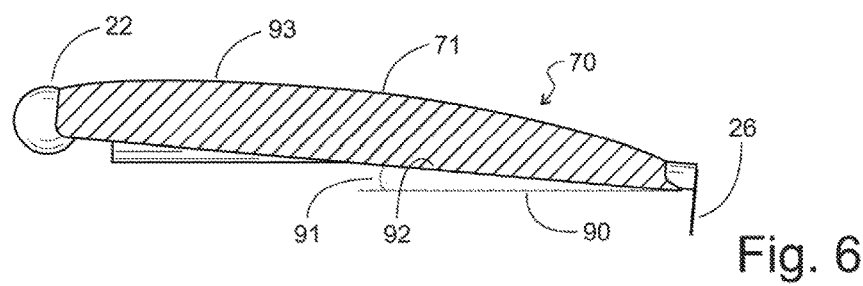
FIG. 6 is a first side cross-section view of the present invention along the medial line.

The following call out list of elements can be a useful guide when referencing the elements of the drawings.
20 Main Body
21 Fuselage
22 Nose
23 Camera
24 Sensor
25 Tail
26 Tail Pusher Propeller
27 Tail Motor
28 Vertical Stabilizer
29 Rudder
30 Wings
31 Right-Wing
32 Left-Wing
33 Right-Wing Junction
34 Left-Wing Junction
35 Wing Junction Gap
36 Right Wing Upper Shell
37 Right Wing Lower Shell
38 Left Wing Upper Shell
39 Left Wing Lower Shell
41 Fuselage Upper Shell
42 Fuselage Lower Shell
43 Wing To Fuselage Junction
44 Fuselage Junction
45 Wing Junction
46 Joining Junction
47 Aileron
48 Canard
49 Elevator
50 Multi-Rotor System
51 Right Forward Extension Arm
52 Right Rear Extension Arm
53 Left Forward Extension Arm
54 Left Rear Extension Arm
55 Right Forward Extension Arm Connection
56 Right Rear Extension Arm Connection
57 Left Rear Extension Arm Connection
58 Left Front Extension Arm Connection
60 Lifting Propellers
61 Right Front Lifting Propeller
62 Right Rear Lifting Propeller
63 Left Front Lifting Propeller
64 Right Rear Lifting Propeller
65 Flight Controller
66 Power Supply
67 Tilt Sensor
68 Avionics And Transceiver
69 Antenna
70 Lifting Body
71 First Airfoil Profile
72 Second Airfoil Profile
73 Airfoil Profile Intersection
74 Center Of Gravity
75 Lifting Body Outside Leading Edge Line
76 Locked Propeller Leading-Edge Line
77 Leading Edge Concave Portion
78 Trailing Edge Concave Portion
79 Forward Tip
80 Motors
81 Right Front Motor
82 Right Rear Motor
83 Left Front Motor
84 Right Rear Motor
85 Outside Tip
86 Trailing Edge
87 Leading Edge Outside Portion
88 Halfway Point
90 Horizontal Line
91 Angle Of Attack
92 Airfoil Lower Surface
93 Airfoil Upper Surface
94 Chord Line
95 Lift Force
96 Airspeed
97 Lifting Propeller Force
98 Lifting Body Airfoil Force
99 Stall Speed
100 Hall Sensor
101 Encoder

DETAILED DESCRIPTION OF THE PREFERRED EMBODIMENT

The present invention is a multirotor vertical lift off aircraft having a main body 20. The main body 20 includes a fuselage 21. The fuselage 21 has a nose 22 and a tail 25. A sensor 24 and a camera 23 can be mounted in the nose 22. A tail motor 27 can be mounted to the tail 25 to power a tail pusher propeller 26. The tail pusher propeller 26 can activate independently of the other propellers and can push the multirotor aircraft forward.

The wings 30 are integrated to the fuselage 21. A right-wing 31 and a left-wing 32 are connected to the fuselage 21 at a right-wing junction 33 and a left-wing junction 34. Between the right-wing junction 33 and the left-wing junction 34 there can be a wing junction gap 35. The wing junction gap 35 forms an airfoil profile along the lateral line 29 and the medial line 28. The construction of the main body 20 is preferably in a pair of pieces, namely an upper shell and a lower shell. The upper shell may have various portions and the lower shell may have various portions. For example, the upper shell can have a right-wing upper shell 36 and a left-wing upper shell 38. Similarly, the lower shell can have a right-wing lower shell 37 and a left-wing lower shell 39. The fuselage of the main body 20 can have a fuselage upper shell 41 and a fuselage lower shell 42. The fuselage upper shell 41 can be integrally formed with the right wing upper shell 35 and the left-wing upper shell 38. A wing junction 45 can join a wing upper shell to a wing lower shell. The junctions can be snap fit, or joined by adhesive. The pair of shells can be plastic injection molded or made of laminate materials.

The upper shell portions can be joined to the lower shell portions at a joining junction 46. The joining junction 46 can have a wing to fuselage junction 43 where the joining junction of the wing connects to the joining junction of the fuselage. Also, the joining junction can have a fuselage junction 44 where the fuselage upper shell 41 joins to the fuselage lower shell 42. The multirotor system 50 has lifting propellers 60 mounted on extension arms. A right forward extension arm 51 extends from the main body 20 at a right forward extension arm connection 55. A right rear extension arm 52 extends from the main body 20 at a right rear extension arm connection 56. A left forward extension arm 53 extends from the main body 20 at a left front extension arm connection 58. A left rear extension arm 54 extends from the main body 20 at a left rear extension arm connection 57.

The lifting propellers 60 are mounted on the motors 80. The right front lifting propeller 61 is mounted to the right front motor 81 which is mounted to the right forward extension arm 51. The right rear lifting propeller 62 is mounted to the right rear motor 82 which is mounted to the right rear extension arm 52. The left front lifting propeller 63 is mounted to the left front motor 83 which is mounted to the left forward extension arm 53. The left rear lifting propeller 64 is mounted to the left rear motor 84 which is mounted to the left rear extension arm 54.

The upper shell portions and the lower shell portions of the main body 20 form a cavity. The cavity can retain avionics and electronics, for example a flight controller 65, a power supply 66, a tilt sensor 67 and other avionics and transceiver 68. Additionally, an antenna 69 can be installed in the cavity of the main body 20. The power supply 66 can be a battery such as a rechargeable battery or an internal combustion engine for charging a rechargeable battery. The flight controller 65 is preferably a multirotor controller for controlling the motor output, receiving transceiver signals and otherwise maintaining the stability and control of the aircraft. The main body 20 has an airfoil shape in more than one orientation such that it forms a lifting body 70. The lifting body 70 has a first airfoil profile 71 along a medial line 28, then has a second airfoil profile 72 along a lateral line 29. The first airfoil profile 71 and the second airfoil profile 72 intersect at an airfoil profile intersection 73. The airfoil profile intersection 73 is behind a center of gravity 74. The center of gravity 74 is between the nose 22 and the airfoil profile intersection 73.

The aircraft has a takeoff mode and a cruising mode. In the cruising mode, the tail pusher propeller 26 propels the aircraft forward and the lifting propellers 60 are in a locked position. The locked propellers have a lock propeller leading-edge line 76 that generally continues to a lift body outside leading-edge line 75. The propellers can be locked with a latch, a servo, using stepping motors, or other motors that can hold a position. The multi-copter blades can be spinning in a spinning mode and locked in a locked mode such as by use of a hall sensor 100 or encoder 101.

The lifting body 70 includes a leading edge concave portion 77 opposite a trailing edge concave portion 78. The leading edge concave portion 77 preferably terminates at a forward tip 79. An outside tip 85 can define a transition between the leading-edge and the trailing edge 86. The leading-edge has a leading-edge outside portion 87 that transitions to the trailing edge 86 at the outside tip 85. The leading-edge outside portion 87 transitions to the leading edge concave portion 77 at the forward tip 79. Preferably, the leading-edge concave portion 77 and is the trailing edge concave portion 78 are open to airflow.

When taking a side view of the present invention, the lifting propellers 60 are preferably parallel to a horizontal line 90. The airfoil lower surface 92 of the lift body 70 opposes the airfoil upper surface 93. The airfoil lower surface 92 and the chord line 94 are both angled relative to the horizontal line 90 such as at an angle of attack 91.

The flight controller 65 maintains an appropriate angle of attack 91 while the multirotor lifting propellers 60 are providing most of the lift power. As the aircraft increases in speed, the lifting body 70 provides more of the lift power relative to the lifting propellers 60. When the airspeed 96 is low, the lift force 95 is 100% lifting propeller force 97 during vertical takeoff. As the airspeed 96 increases, the lifting body 70 has a lifting body airfoil force 98 that surpasses the lifting propeller force 97. At higher speed, when the lifting propeller force 97 is smaller relative to the lifting body airfoil force 98, the flight controller 65 can turn off the lifting propellers 60 and lock them into cruising mode position. At a halfway point 88, the lifting force 95 is half due to the lifting body airfoil force 98 and half due to lifting propeller force 97 such that the lifting force 95 due to the lifting body airfoil is equivalent to the lifting force 95 due to the lifting propeller force. The halfway point 88 is at a speed that is higher than a stall speed 99 of the lifting body 70. To improve performance while getting past the stall speed 99 of the lifting body 70, additional control and stability surfaces such as ailerons 47, a canard 48, an elevator 49, and a rudder 29 can improve control and stability.

Figure 14:
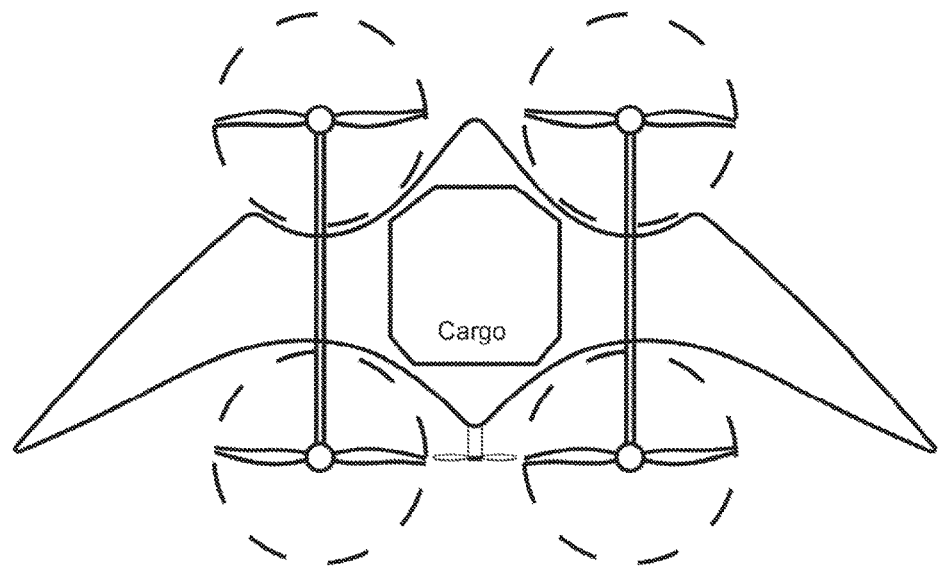
FIG. 14 is a diagram of a four rotor lifting body.
Figure 15:
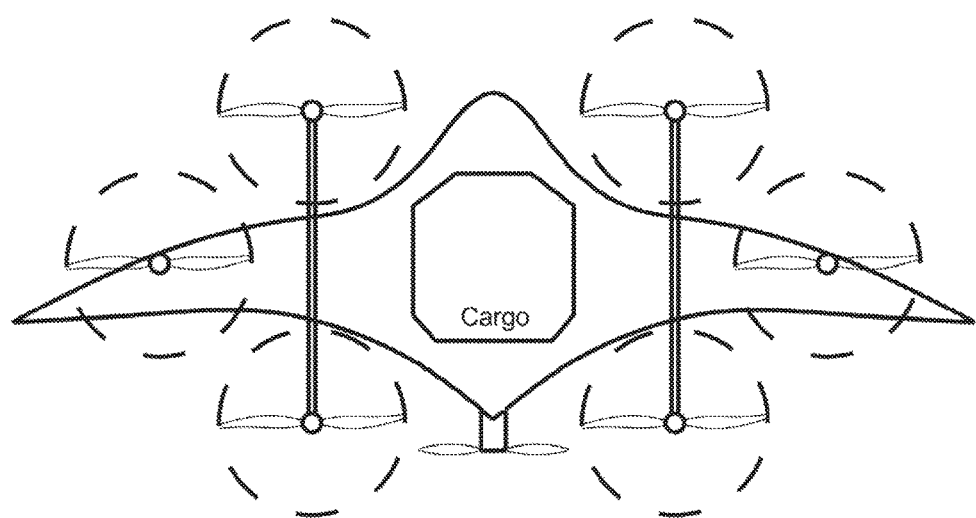
FIG. 15 is a diagram of a six rotor lifting body.

The aircraft can maintain a stable flight at the halfway point 88. Although lifting body airfoil force 98 is more energy efficient, the aircraft can still save substantial energy by having at least a partial lifting body airfoil force 98. For example, the lifting body airfoil force 98 can be 50%, 80% or 100%. The present invention can be implemented as a three rotor, four rotor, five rotor, or more. For example, FIG. 14 is a diagram of a six rotor lifting body. The six rotor lifting body can also have a stable mixed mode cruising state with the lifting body airfoil force 98 as a fraction of the total lifting force.

Figure 7:
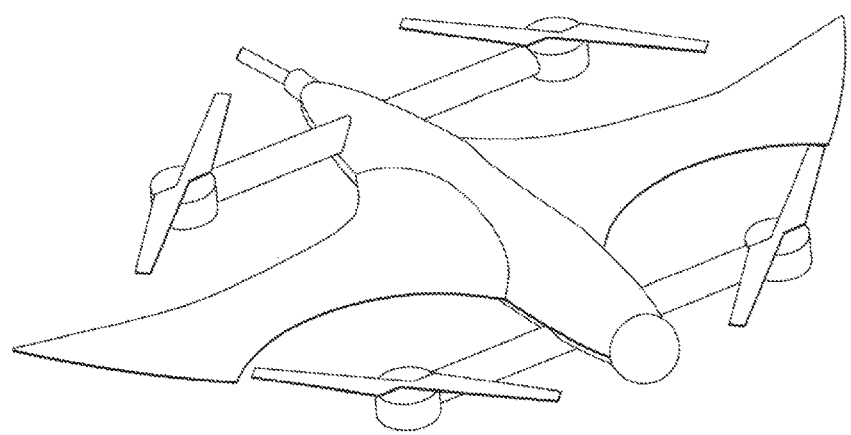
FIG. 7 is a second perspective view of the present invention.

As seen in the figures, the extension arms can be connected at the extension arm connections to the wings as seen in FIG. 1, or to the fuselage as seen in FIG. 7. The extension arms can be oriented perpendicular or parallel to the fuselage. The lifting body 70 can have lift in a forward direction and also in a direction that is lateral to the forward direction due to the lifting body having an airfoil profile in a forward direction as well as in a lateral direction perpendicular to the forward direction.

The airfoil profile in both the forward and lateral direction allows the lift body to generate lift from airflow arriving from the front, front left, front right, left or right for example. This maintains lift during sudden changes in relative airspeed such as due to changes in the wind or aircraft direction. The combination of the lifting body and lifting rotors provides a steady lift force throughout a full range of airspeed from a variety of different directions.

Figure 8:
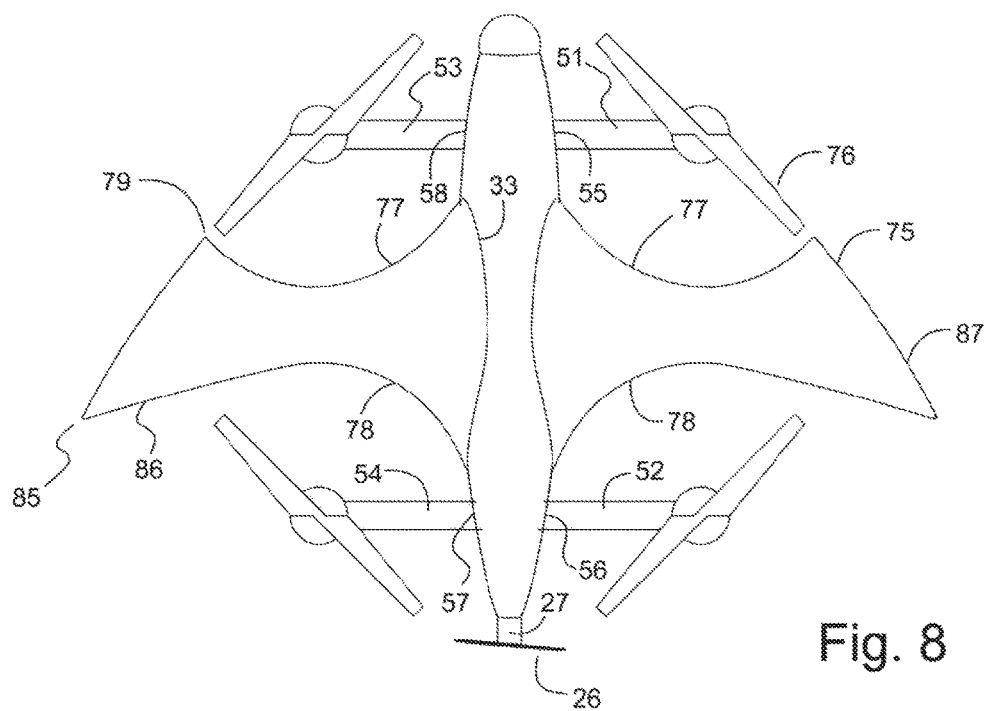
FIG. 8 is a second top view of the present invention.
Figure 9:
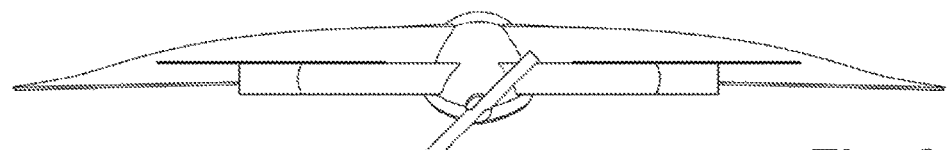
FIG. 9 is a second rear view of the present invention.
Figure 10:
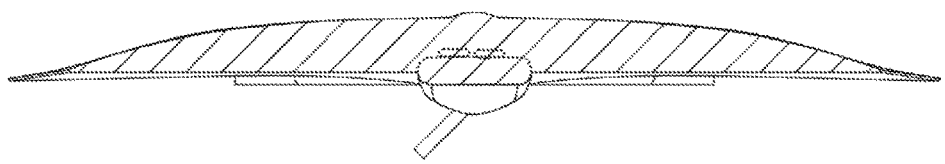
FIG. 10 is a second front cross-section view of the present invention along the lateral line 29.
Figure 11:
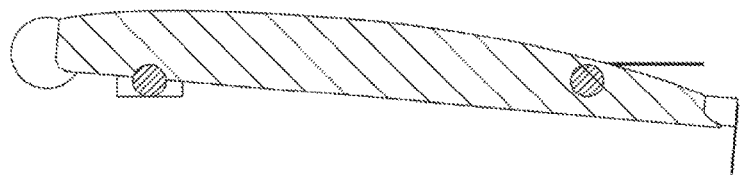
FIG. 11 is a second side view of the present invention.
Figure 12:
FIG. 12 is a second side cross-section view of the present invention along the medial line.
Figure 13:
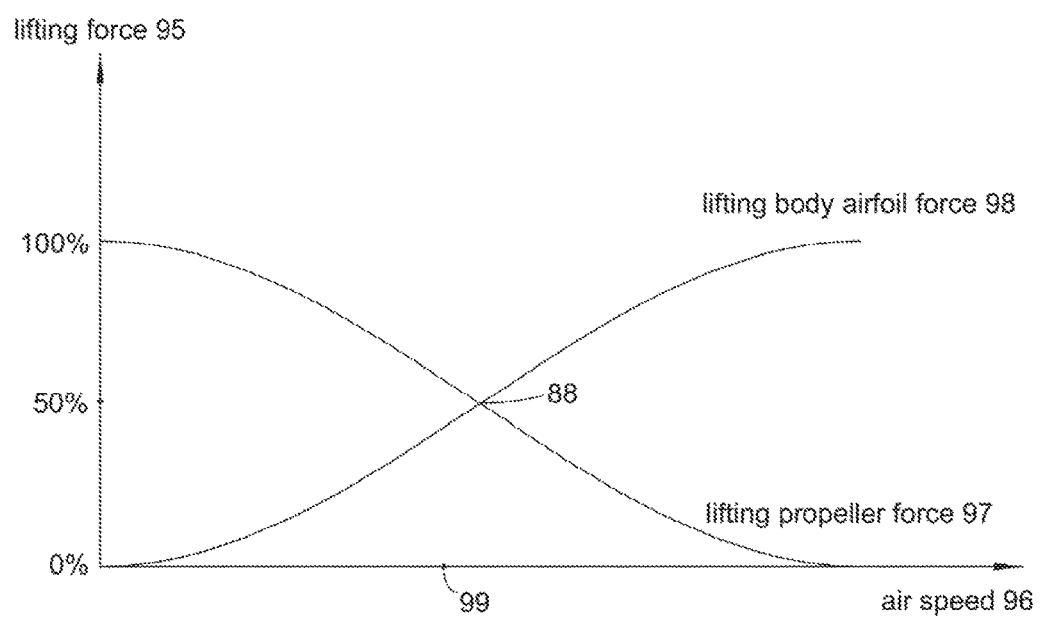
FIG. 13 is a second diagram of the relative lift power of the lifting body to lifting rotor.

The number of rotors can be varied. As seen in FIG. 8, a six rotor lifting body provides six rotors instead of just four. A variety of different numbers of rotors can be used.

When carrying cargo, the center of gravity might be shifted caused by the cargo center of gravity not being centered. The lifting propeller speed can be varied to accommodate the shifted center of gravity due to non-centered cargo. For example, if the cargo is forward shifted, the forward propellers can spin faster to create more lift to compensate for the excessive forward center of gravity. For example, in this case the rear propellers may operate as usual.

During forward flight, for controlling attitude, instead of using control surfaces, the various lifting propellers can spin at varied speeds for controlling the flight of the aircraft. The lifting body need not have any control surfaces. The lifting propellers can spin at low RPM for attitude control when most of the lift is being generated by the lifting body. The lifting propellers can idle at about 200-500 RPM so that they can speed up when necessary. This occurs when the lifting body generates a majority of the lift.

What is claimed is:

1. A multi-copter lift body aircraft comprising:
   a. a push or pull propeller;
   b. a lift body comprised of a main body and at least a pair of wings coupled to the main body, the main body has a first airfoil shape on a front to rear cross-section along a medial line of the lift body, and each of the at least a pair of wings has a third airfoil shape substantially similar to said first airfoil shape, wherein the lift body has a nose and a tail;
   c. multi-copter propellers having blades coupled to the lift body, wherein the multi-copter propellers are without shrouds and provide a multi-copter propeller lift at low speeds, wherein the lift body provides a lift body lift at high speeds; and
   d. avionics stored in a hollow cavity of the lift body, wherein the avionics includes a control circuit, batteries, and a radio receiver, wherein during a forward flight when the lift body generates a majority of the lift, the lifting propellers spin at varied speeds for controlling attitude, wherein the lift body does not have control surfaces, wherein lift body lift increases as an airspeed increases and a multi-copter propeller lift decreases so that the aircraft maintains the same altitude at any speed up to a top speed; and
   wherein each of the pair of wings has a top surface, said main body has a top portion, and the top surfaces of each of said pair of wings extend over a portion of said top portion of the main body forming a continuous contour;
   wherein the aircraft is unmanned.

2. The multi-copter of claim 1, wherein the lifting propellers spin at varied speeds for assisting in controlling the flight of the aircraft, wherein when carrying cargo, a lifting propeller speed is varied to accommodate a shifted center of gravity due to non-centered cargo.

3. The multi-copter of claim 1, wherein the lift body further comprises a second airfoil shape along a later line of the lift body, the second airfoil shape allows the lift body to generate lift from an airflow arriving from a lateral direction.

4. The multi-copter of claim 1, wherein the first airfoil shape in the main body has an optimum attack angle at a cruising speed, wherein the lift body provides a combined lift mode.

5. The multi-copter of claim 1, wherein the lift body includes a canard.

6. The multi-copter of claim 1, wherein the center of gravity of a multi-copter mode is the center of gravity of an airfoil mode.

7. The multi-copter of claim 1, wherein the multi-copter blades are locked into an unspinning position during flight.

8. The multi-copter of claim 1, wherein the lift body has open concave curvatures from a top view.

9. The multi-copter of claim 1, wherein the lift body includes a camera in the nose of the lift body when said push propeller is mounted to the tail of the lift body.

10. A multi-copter lift body aircraft comprising:
    a. a push or pull propeller;
    b. a lift body comprised of a main body and at least a pair of wings coupled to the main body, the main body has a first airfoil shape on a front to rear cross-section along a medial line of the lift body, and each of the at least a pair of wings has a third airfoil shape substantially similar to said first airfoil shape, wherein the lift body has a nose and a tail;
    c. multi-copter propellers having blades coupled to the lift body, wherein the multi-copter propellers are without shrouds and provide a multi-copter propellers lift at low speeds, wherein the lift body provides a lift body lift at high speeds; and
    e. avionics stored in a hollow cavity of the lift body, wherein the avionics includes a control circuit, batteries, and a radio receiver, wherein during a forward flight when the lift body generates a majority of the lift, the lifting propellers spin at varied speeds for controlling attitude, wherein the lift body has control surfaces which are active, wherein the lift body lift increases as an airspeed increases and a multi-copter propeller lift decreases so that the aircraft maintains the same altitude at any speed up to a top speed; and
    wherein each of the pair of wings has a top surface, said main body has a top portion, and the top surfaces of each of said pair of wings extend over a portion of said top portion of the main body forming a continuous contour;
    wherein the aircraft is unmanned.

11. The multi-copter of claim 10, wherein the lifting propellers spin at varied speeds for assisting the active control surfaces in controlling the flight of the aircraft, wherein when carrying cargo, a lifting propeller speed is varied to accommodate a shifted center of gravity due to non-centered cargo wherein the lift body has an airfoil with an attack angle that is not horizontal.

12. The multi-copter of claim 10, wherein the lift body further comprises a second airfoil shape along a later line of the lift body, the second airfoil shape allows the lift body to generate lift from an airflow arriving from a lateral direction.

13. The multi-copter of claim 10, wherein the first airfoil shape of the main body has an optimum attack angle at a cruising speed, wherein the lift body provides a combined lift mode.

14. The multi-copter of claim 10, wherein the lift body includes a canard forward control surface.

15. The multi-copter of claim 10, wherein the center of gravity in a multi-copter mode is the center of gravity in an airfoil mode, wherein the center of gravity in said airfoil mode is approximately ⅓ from the nose.

16. The multi-copter of claim 10, wherein said control surfaces include at least one selected from a group consisting of a rudder, an aileron and an elevator.

17. The multi-copter of claim 10, wherein the multi-copter blades are locked into an unspinning position during flight.

18. The multi-copter of claim 10, wherein the lift body has open concave curvatures.

19. The multi-copter of claim 10, wherein the lift body includes a camera in the nose of the lift body when said push propeller is mounted to the tail of the lift body.

* * * * *